United States Patent [19]

Jänicke et al.

[11] 4,081,652

[45] Mar. 28, 1978

[54] ELECTRICAL DISCHARGE MACHINING BY MEANS OF A WIRE ELECTRODE

[75] Inventors: Johann Jänicke, La Chapelle Rambaud, France; Georges-Andre Marendaz, Meyrin, Switzerland

[73] Assignee: Ateliers des Charmilles, S.A., Geneva, Switzerland

[21] Appl. No.: 708,606

[22] Filed: Jul. 26, 1976

[30] Foreign Application Priority Data

Aug. 13, 1975 Switzerland .................. 10516/75

[51] Int. Cl.² .............................................. B23P 1/08
[52] U.S. Cl. ................................ 219/69 W; 219/69 M
[58] Field of Search ............. 219/69 W, 69 G, 69 M; 235/151.1, 151.11; 315/227 A; 204/206, 224 M; 318/571

[56] References Cited
U.S. PATENT DOCUMENTS

| | | | |
|---|---|---|---|
| 3,671,705 | 6/1972 | Raznitsyz | 219/69 W |
| 3,731,043 | 5/1973 | Ullmann et al. | 219/69 W |
| 3,731,045 | 5/1973 | Ullmann et al. | 219/69 W |
| 3,943,322 | 3/1976 | Lehmann et al. | 219/69 W |
| 4,002,885 | 1/1977 | Bell et al. | 219/69 W |

*Primary Examiner*—Bruce A. Reynolds
*Attorney, Agent, or Firm*—Hauke & Patalidis

[57] ABSTRACT

In an EDM process and apparatus, an arrangement for automatically correcting machining errors while effecting a cut in a workpiece by means of a wire electrode when the cutting path of the wire electrode relative to the workpiece is along a curve or an angle, for example, rather than along a straight line. The speed of relative displacement between the wire electrode and the workpiece electrode is automatically varied as a function of the shape of the cutting path, such that the distance between the longitudinal axis of the wire electrode and of one of the cut surfaces of the workpiece is maintained constant, irrespective of the curvature or angularity of the cutting path.

18 Claims, 6 Drawing Figures

ELECTRICAL DISCHARGE MACHINING BY MEANS OF A WIRE ELECTRODE

BACKGROUND OF THE INVENTION

The present invention relates to a process and an apparatus for machining a workpiece by means of intermittent electro-erosive discharges applied between the electrode tool and the electrode workpiece of a wire electrode EDM machine. The process and apparatus of the invention permit to considerably improve the precision of the machining.

In wire electrode EDM machines, the electrode tool, in the form of a metallic electrically conductive wire continuously fed axially at a constant speed within the machining zone, is subjected to a displacement in a direction transverse to its longitudinal axis while following a predetermined cutting trajectory or path relative to the workpiece, at a relative speed predetermined as a function of the machining conditions. The trajectory or path, which is programmed as a function of the shape of the part to be obtained, takes into consideration the distance between the longitudinal axis of the wire electrode and the machined surfaces. It has been observed that the forward machining gap, between the leading edge of the wire electrode and the bottom of the cut in the workpiece, is less than the lateral gaps between the wire sides and the opposed wall surfaces of the cut in the workpiece. This is apparently due to the fact that some electro-erosion of the workpiece is effected laterally, simultaneously with the electro-erosion occurring at the leading edge of the wire electrode, as a result of the relatively long duration side machining which is effected between surfaces which are substantially parallel to the direction of feed of the wire electrode relative to the workpiece.

The distance separating the sidewall surfaces of the cut in the workpiece is a function of the diameter of the wire electrode and of the ratio of the speed of translation of the axis of the wire electrode to the feed speed of a tangent to the wire along the direction of advance or feed of the wire into the workpiece. When the wire electrode feed is along a rectilinear path, the ratio is equal to 1 and the axis of the wire is consequently positioned at the center of the distance separating the sidewall surfaces of the machined workpiece. However, when the path is along a curve, the relative speed of displacement of one of the lateral machining gaps increases with respect to the sidewall surfaces on the outside of the curve, and the relative speed of the other lateral machining gap decreases relative to the sidewall surface on the inside of the curve, such that the distance between the axis of the wire and the machined surfaces decreases with respect to the outer surface and increases with respect to the inner surface. There result some errors which affect the machining accuracy.

The error is even worse when the cutting path of the wire electrode is along an angular path. Under certain conditions, the lateral machining gap, at the vertex of the angular cut, is about of the same order of magnitude as the leading edge gap, and there results a machining error which may be greater than 10μ.

The present invention permits to eliminate such a machining error. The present invention provides means for varying the speed of relative displacement between the wire electrode and the workpiece, as a function of the shape of the cutting path, for maintaining constant the distance between the axis of the wire electrode and one of the surfaces of the cut in the workpiece.

The present invention accomplishes its purpose by providing an adaptive control of the speed of feed of a wire electrode in an EDM machine which eliminated practically all the errors between the programmed cutting path of the wire electrode and the configuration of the machined workpiece in the portions of the cutting path effected along substantial curves.

A further advantage of the present invention is to obtain such results by means of a simple and inexpensive arrangement of elements, utilizing the information already present in the programmed cutting path of the wire electrode.

BRIEF DESCRIPTION OF THE DRAWING

The accompanying drawing illustrates, in a schematic manner and for illustrative purposes only, an arrangement of elements and modifications whereof for practicing the present invention. In the drawing wherein like reference numerals relate to like or equivalent elements.

DETAILED DESCRIPTION OF THE PREFERRED EMBODIMENTS

Figure 1:
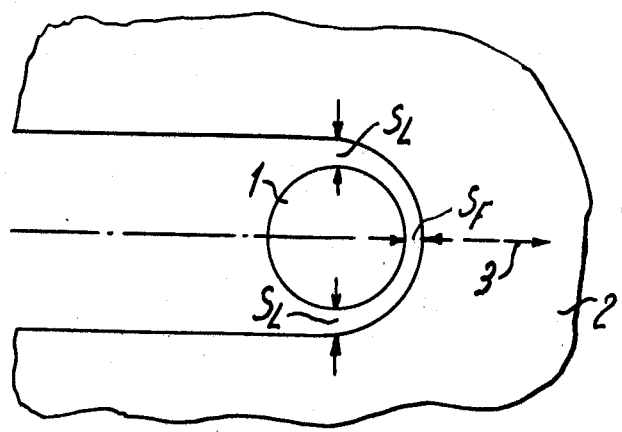
FIG. 1 is a schematic illustration of the machining effect of a wire electrode while effecting a straight cut in a workpiece.

FIG. 1 is a schematic view of a wire electrode effecting a cut in a workpiece 2, taken along a plane perpendicular to the axis of the wire electrode 1, cross-hatching having been omitted for the sake of clarity and simplicity. In order to effectuate a cut in the workpiece 2 by means of electrical discharges, a pulse generator (not shown) is connected between the wire electrode 1 and the workpiece 2, while appropriate means, not shown, feed the electrode wire 1 relative to the workpiece 2 along a cutting path 3. The wire electrode 1 and the workpiece 2 are immersed in an appropriate machining fluid, generally consisting of a dielectric liquid fluid.

Any incremental displacement of the wire 1 along the path 3, assuming that no machining is effected, results in a decrease of the distance separating the wire surface from the bottom surface of the cut in the workpiece which is maximum along the axis of the cutting path 3, the distance between the wire surface and the surface of the cut walls increasing progressively for any point between that point and the diametrally opposed points at which a tangent to the surface of the wire is parallel to the path axis. The result is that the density of electrical discharges is more intense, because of the shorter gap, at the leading surface of the wire, and that the density of electrical discharges density decreases towards the lateral surfaces of the wire. However, because the lateral surfaces of the wire and the wall surfaces of the cut in the workpiece 2 are opposed to each other during a period of time relatively long, the lateral gap $S_L$ is greater than the leading edge gap $S_F$. Under the conditions illustrated at FIG. 1, the path 3 being rectilinear, the lateral gaps $S_L$ on both sides of the wire electrode 1 are equal.

Figure 2:
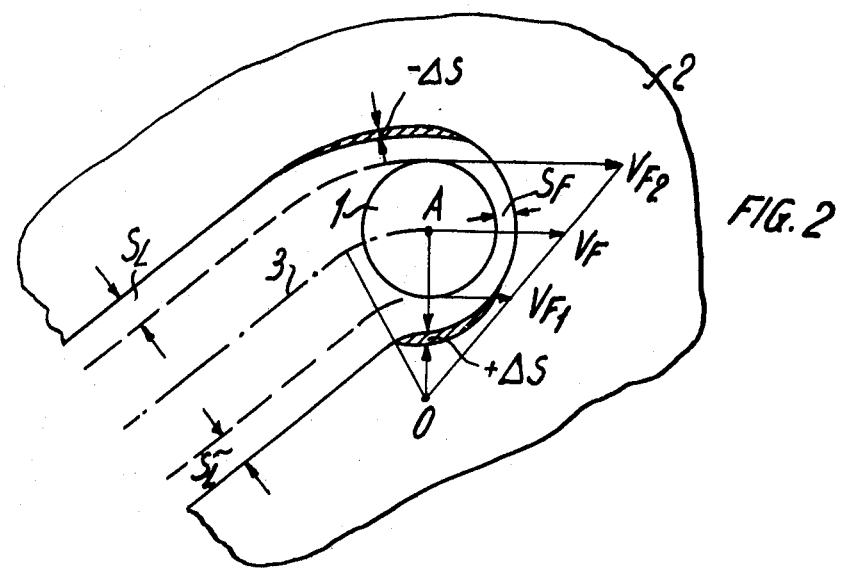
FIG. 2 is a schematic illustration of the lack of symmetry of the cut path which normally results when the path is along a substantial curve.

FIG. 2 illustrates what happens when the path 3 is curvilinear, the center of the curve being arbitrarily designated by O. As a result of the curvature of path 3, the relative speed at different points on the periphery of the wire 1 is not the same, and the speed of the center A of the section of wire 1 is designated by $V_F$, while the speed of the lateral section of the wire which is closest to the center O of curvature has been designated by $V_{F1}$ and the speed of the lateral portion of the wire most remote from the center O has been designated by $V_{F2}$.

Because the speed $V_{F1}$ is smaller than the average speed at which the wire 1 is fed into the workpiece 2, the result is that the lateral machining gap proximate to the center of curvature O is wider than the distance $S_L$, the difference between the lateral machining gap and the distance $S_L$ being designated by $+\Delta_r$. Conversely, with respect to the lateral machining gap on the side opposite to the center of curvature O the speed is greater and there is a decrease of the lateral machining gap as compared to the normal gap $S_L$, the difference between the two being designated by $-\Delta_r$.

Figure 3:
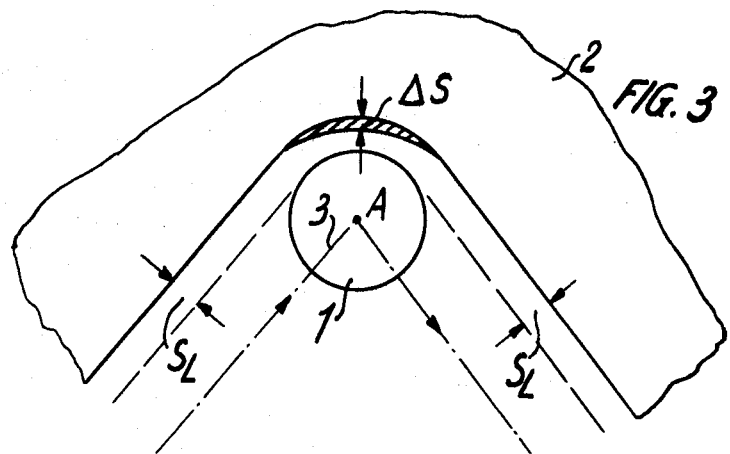
FIG. 3 is a schematic illustration similar to FIGS. 1 and 2, representing the resulting machining conditions when the path of the wire electrode is caused to effectuate a sharp angle change of direction.

FIG. 3 illustrates the conditions when the wire electrode path changes direction under a sharp angle. Under such conditions, the portion of the workpiece 2 disposed at the apex of the sharp angle is subjected to electrical discharges for a very short period of time, and the difference $\Delta_s$ between the obtained lateral gap and the normal lateral gap $S_L$ is very substantial, unless particular precautions are taken.

The present invention contemplates eliminating machining errors, causing the dimensional and configurational errors $\Delta_s$ as hereinbefore explained by varying the speed of relative displacement between the wire electrode 1 and the workpiece 2. In the example of the operation illustrated at FIG. 2, if it is desired to maintain the machining gap $S_L$ relative to the portion farthest from the center O of path curvature, the feed velocity $V_F$ is decreased such that the velocity $V_{F2}$ is brought back to a value corresponding to the average feed speed. If, on the contrary, it is desired to maintain the gap $S_L$ relative to the portion closest to the center O, the feed speed is increased such as to cause the speed $V_{F1}$ to be equal to the average feed speed of the wire electrode.

In the example of FIG. 3, the error $\Delta_s$ is eliminated by stopping the feed advance of the electrode wire 1 at the top or vertex of the cutting path for a period of time adequate to re-establish the normal lateral gap $S_L$.

Figure 4:
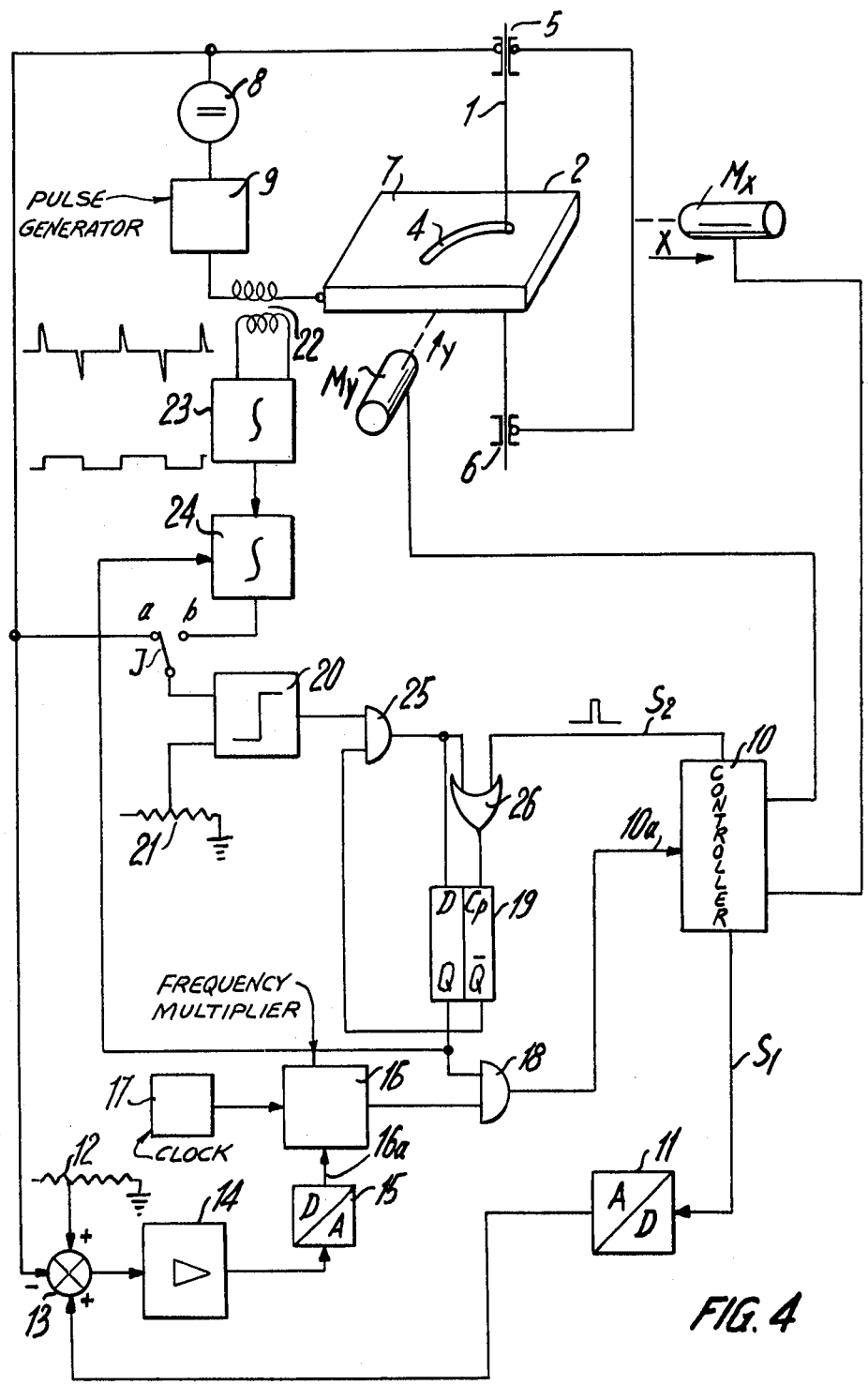
FIG. 4 is a schematic block diagram of an arrangement for practicing the invention.

FIG. 4 is a schematic block diagram representation of an arrangement for effecting the error corrections hereinbefore explained with reference to FIGS. 2 and 3. Only the basic elements of an EDM machine are represented on the block diagram. The wire electrode 1 is held and guided by linear bearings or bushings 5 and 6, whose displacement in unison relative to the workpiece 2, in a lateral direction, permits to effectuate a cut 4 in the workpiece 2. The relative displacement of the wire electrode 1 and workpiece 2 along an appropriate trajectory or cutting path is effected by a pair of servo motors $M_x$ and $M_y$. The motor $M_x$ displaces the electrode wire guide bushings 5 and 6 along a straight line, or X-axis, while the motor $M_y$ displaces the workpiece 2 in a direction perpendicular to the X-axis, or Y-axis. The electrical discharges between the wire electrode 1 and the workpiece 2 are obtained from a pulse generator 9 supplied by a source 8 of direct current.

The command signals supplied to the motors $M_x$ and $M_y$ are obtained at separate outputs of a controller 10 having an input 10a accepting a signal controlling the speed of lateral advance of the wire electrode 1 relative to the workpiece 2. This input signal consists of a variable number of pulses during a predetermined time interval, such pulses being supplied by a frequency multiplier circuit 16, well-known in the field under the nomenclature of a BRM circuit. The frequency multiplier circuit 16 accepts pulses from a clock 17 and supplies at its output pulse trains each having a number of pulses dependent from a digital signal applied to an input 16a of the frequency multiplier circuit 16.

The frequency multiplier circuit 16 is, in turn, controlled by the controller 10 which supplies at one of its outputs a digital signal $S_1$ of correction of the electrode feed speed as a function of the path curvature. The signal $S_1$ is applied to a digital-analog converter 11, and the analog signal at the output of the digital-analog converter is fed to a comparator 13 which further receives a signal corresponding to the voltage across the wire electrode 1 and the workpiece 2. The voltage across the wire electrode and the workpiece electrode is compared to a reference voltage obtained at the output of a potentiometer 12, such as to obtain a signal representative of the difference between the two voltages. The latter signal is modified as a function of the correction signal of the feed speed obtained at the output of the digital-analog converter 11.

The controller 10 has another output on which appears a signal $S_2$ when the cutting path changes direction at a sharp angle. The signal $S_2$ is applied to an input of an OR gate 26, the output of which is connected to the input $C_p$ of a memory flip-flop 19.

The flip-flop 19 is controlled by a digital signal corresponding either to the machining current or the machining voltage. For that purpose a double-pole switch J permits, when its movable contact is placed in engagement with fixed contact a, to supply the machining voltage to an input of a Schmitt trigger 20, having its other input connected to the output of a potentiometer 21. The Schmitt trigger 20 supplies an output signal as soon as the machining voltage reaches the reference voltage supplied at the output of the potentiometer 21. The signal at the output of the Schmitt trigger 20 is applied to an input of an AND gate 25, and from the output of the AND gate 25 simultaneously to an input of the OR gate 26 and to the input D of the flip-flop 19. The other input of the AND gate 25 is supplied a gating signal obtained from the output Q of the flip-flop 19.

The potentiometer 21 is adjusted for supplying as its output a reference voltage corresponding to the machining voltage providing a machining gap equal to $S_1$. The reference voltage is therefore higher than the average machining voltage which is mainly determined by the machining gap $S_F$. Consequently, in the course of a normal straight path cut, the Schmitt trigger 20 does not provide any output signal. However, if the path is along a sharp angle, the controller 10 provides a signal at its output $S_2$, and the flip-flop 19 is switched to the state corresponding to a "zero" signal applied to its input D. Consequently, there is a "zero" signal at the output Q of the flip-flop and there is a signal such as a "one" at the output $\bar{Q}$. The "zero" signal at the output Q is applied to an input of an AND gate 18 and therefore inhibits the gate and prevents the pulses supplied at the output of the frequency multiplier circuit 16 from reaching the input 10a of the controller 10, with the result that the feed advance of the wire electrode 1 relative to the workpiece 2 is stopped. As a consequence of stopping the feed of the wire electrode relative to the workpiece, the average machining voltage is caused to increase, and when this voltage reaches the reference voltage determined by the potentiometer 21, the Schmitt trigger supplies at its output a signal which is passed through the AND gate 25 because, simultaneously thereiwth, the output $\overline{Q}$ of the flip-flop 19 provides a logical "1". The flip-flop 19 changes immediately to its other state, because the signal at the output of the AND gate 25 is also applied to the reset input $C_p$ of the flip-flop through the OR gate 26. As a consequence, a logical "1" appears at the output Q of the flip-flop 19 and at one of the inputs of the AND gate 18, which in turn enables the AND gate 18 to pass the feed command signals from the output of the frequency multiplier 16 to the input 10a of the controller 10.

The determination of the time interval during which the wire electrode feed is inhibited in order to avoid machining errors when the electrode cutting path is affected with an abrupt change of direction may also be obtained from the machining current signal. For that purpose, the machining current pulses are detected by means of a transformer-like differenciator 22 and the resultant signals are fed to an integrator circuit 23 which provides at its output a signal proportional to the pulse current. The output of the integrator circuit 23 is connected to the input of a second integrator circuit 24 providing at its output a signal varying in amplitude as a function of the number and the duration of the pulses at its input. The signal at the output of the second integrator 24 is therefore an analog representation of the material removed from the workpiece during the measuring interval.

In this manner, with the switch J having its movable contact engaged with contact b, the interval of time during which the relative advance between the wire electrode 1 and the workpiece 2 is interrupted is determined by integration of the machining current, the discontinued feed being re-established in the manner previously explained, when the flip-flop 19 is reset. This occurs as soon as the output signal from the integrator 24 reaches the reference voltage determined by the setting of the potentiometer 21.

As soon as the flip-flop 19 is reset to its state re-establishing the feed advance of the wire electrode 1, the flip-flop output Q supplies to the integrator 24 a reset signal, such that the integrator is ready for a new integration.

Figure 5:
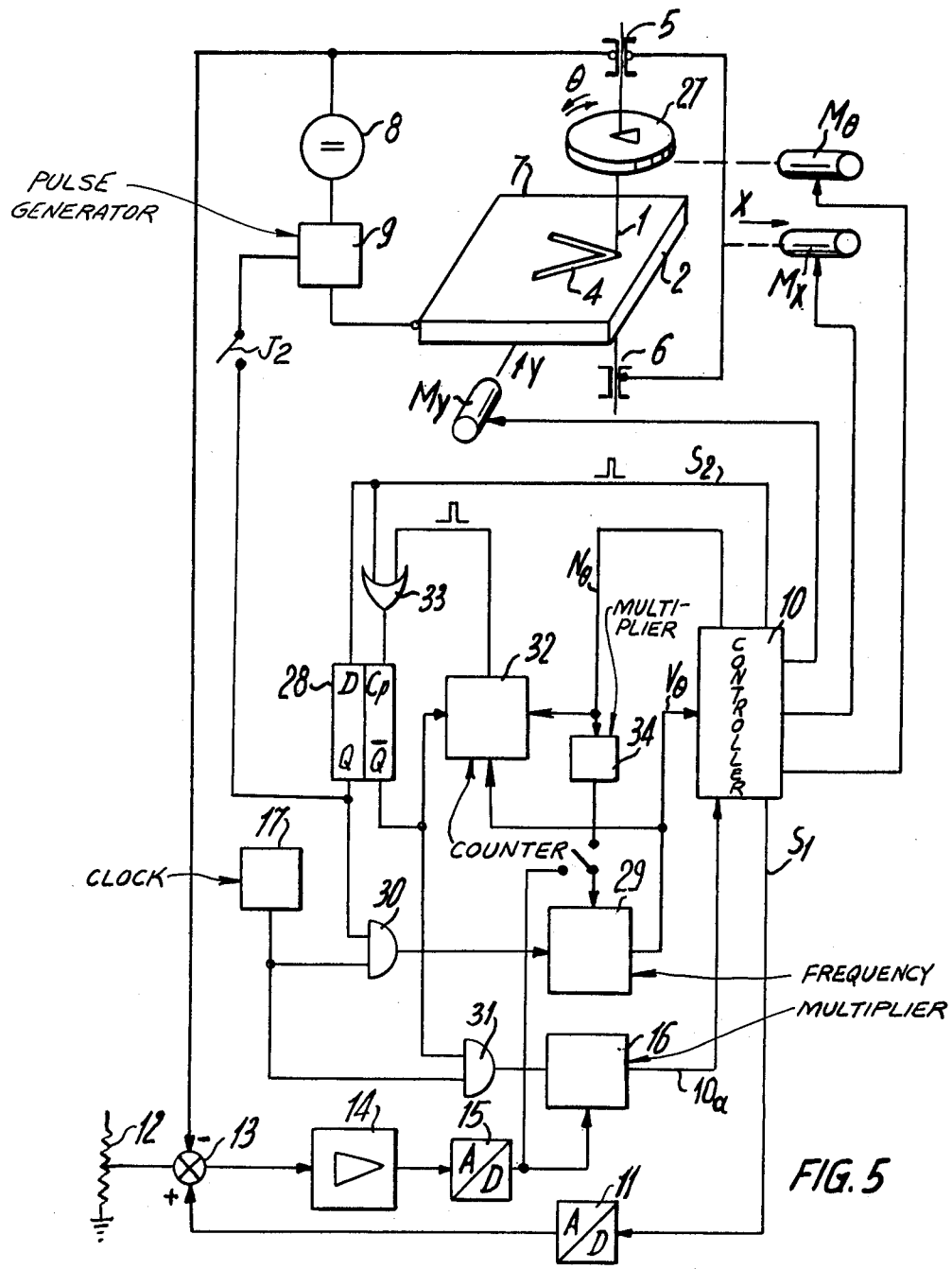
FIGS. 5 and 6 are schematic block diagrams of modifications of the invention.

FIG. 5 represents a schematic block diagram similar to that of FIG. 4, but in which the EDM machine is further provided with an arrangement for varying the angle of the longitudinal axis of the electrode wire 1 relative to the workpiece 2, i.e., relative to the table supporting the workpiece 2. Such an arrangement is capable of providing a range of angularity to the cut in the workpiece.

As illustrated at the top portion of FIG. 5, the arrangement for varying the angular orientation of the wire electrode 1 consists of a disc 27 provided with an eccentric aperture through which the wire electrode 1 is passed, the disc 27 being capable of being driven in rotation by means of a motor $M_\theta$. The controller 10, in addition of being provided with a pair of outputs each controlling the motors $M_x$ and $M_y$, is provided with a further output for controlling the motor $M_\theta$.

The control of the feed by means of the motors $M_x$ and $M_y$ is obtained in the same manner as explained with respect to FIG. 4, except that the output of the frequency multiplier circuit 16 is directly connected to the input 10a of the controller 10, the AND gate 18 of FIG. 4 being replaced by an AND gate 31 connected between the clock 17 and the frequency multiplier circuit 16.

The controller 10 is provided with an additional input $V_\theta$ for controlling the operation of the motor $M_\theta$ and with an output $N_\theta$ supplying a signal corresponding to a predetermined number proportional to the desired angular rotation of the disc 27. This number is applied to a counter 32 which provides a pulse to an input of an OR gate 33 as soon as the desired value of angular rotation of the disc 27 is achieved. If this desired value is reached for a point of the cutting path which does not correspond to a sharp angular change of direction, the controller 10 does not supply any signal at its output $S_2$, such that the pulse applied from the counter 32 to the input $C_p$ of the flip-flop 28 provides a logical "0" at the flip-flop output Q. This logical "0" is supplied to an input of an AND gate 30, which inhibits the pulses from the output of the clock 17 from being applied to a frequency multiplier circuit 29, the frequency multiplier 29 providing at its output a signal controlling the operation of the motor $M_\theta$. When the AND gate 30 is inhibited by the flip-flop 28, the flip-flop output $\overline{Q}$ provides a logical "1" which enables the AND gate 31.

When the wire electrode path is subjected to a sharp angular change of direction, the controller 10 provides a signal at its output $S_2$ which is applied to the input $C_p$ of the flip-flop 28, thus setting the flip-flop 28 and inhibiting the AND gate 31, while enabling the AND gate 30. Such an action is necessary because during cutting around a sharp angle, the wire electrode 1 must take a different inclination for continuing cutting after describing the sharp angle.

The circuit of FIG. 5 further comprises an adjustable numerical multiplier 34 which accepts the output signal $N_\theta$ from the controller 10, and which in turn controls the frequency multiplier circuit 29 for maintaining constant the ratio between the angle of rotation of the disc 25 and the speed at which the rotation of the disc is effected. This constant ratio between a displacement and a speed permits to establish the time interval during which the angular rotation is effected and the interval of time during which the wire electrode is held stationary at the vertex of the path angle. This ratio must be adjusted as a function of the machining current level.

When the distance between the linear bearings 5 and 6 is relatively wide, the axis of the wire electrode is slightly deflected from a straight line as a result of the forces acting on the electrode wire during electrical discharge machining. Thus the displacement of the wire electrode in the vicinity of its middle portion may lag relative to the displacement of the upper and lower linear bearings, and the lag between the portion of the wire and that of the support bearings may reach for example 0.4mm for a workpiece thickness of 70mm. Under such circumstances, the machining error cannot be entirely avoided by the sole modification of the advance speed of the wire electrode when machining an angular or sharply arcuate cut in the workpiece.

The wire electrode can be straightened by reducing the machining rate, i.e., by decreasing the energy of the electrical discharges and/or their frequency.

Reduction of the machining rate is obtained in the circuit of FIG. 5 by means of a double-pole switch $J_1$ disconnecting the circuit 29 from the circuit 34 and connecting the circuit 29 with the circuit 15, while closing a switch $J_2$ for connecting the output Q of the flip-flop 28 to a control input of generator 9 in order to reduce the energy and/or the frequency of the machining discharges for the time interval during which the rotation of the disc 27 is controlled by the signal pulses $S_2$.

Figure 6:
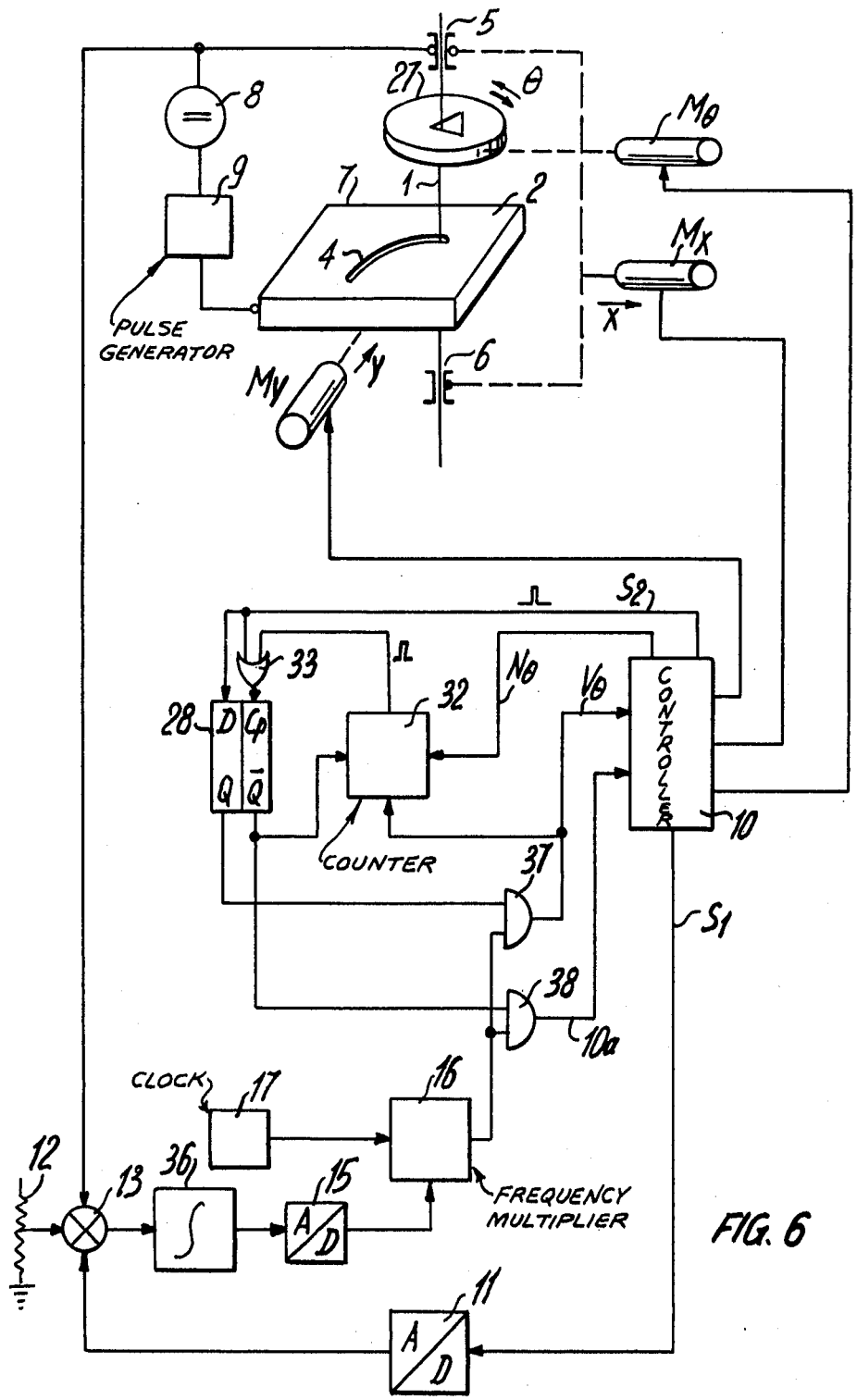

FIG. 6 illustrates a further modification of the invention which is quite similar to that of FIG. 5, but in which the speed of feed of the wire electrode 1 and the speed of rotation of the disc 27 are controlled alternatively by a single frequency multiplier circuit 16. The frequency multiplier circuit 16 is, in turn, controlled by an adjusting magnitude obtained from the comparator 13 acting as an error discriminator. The output of the comparator is applied to the analog-digital converter 15 through an integrator 36.

A pair of AND gates 37 and 38, controlled by the flip-flop 28, permits to switch the output signals from the frequency multiplier 16 either through the input 10a of the controller 10 for the purpose of controlling the feed speed and motion by means of the motors $M_x$ and $M_y$, or alternatively to the input $V_\theta$ for controlling the motor $M_\theta$.

As soon as the wire electrode reaches an abrupt angular change of direction in its cutting path, the wire electrode feed is stopped, the difference between the reference magnitude given by the potentiometer 12 and the machining voltage increases, and the speed of rotation of the disc 27 increases as a function of the integral of the difference. The counter 32 integrates, in turn, this rotational speed and initiates a switching of the state of the flip-flop 28 as soon as the rotation reaches an angle determined by the number $N_\theta$. In this manner, the duration of the rotation of the disc 27 varies as an inverse function of the speed at which the difference between the machining voltage and the reference magnitude increases, i.e., as an inverse function of the machining speed. In addition, the duration of rotation is also subject to a variation as a function of the path angle, but in view of the two-step integration, this second variation is relatively small.

Having thus described the invention by way of practical embodiments thereof, modifications whereof will be apparent to those skilled in the art, what is claimed as new is as follows:

1. In a process for machining a workpiece electrode by means of intermittent electrical discharges applied between a wire electrode and said workpiece electrode, wherein said electrodes are relatively displaced along a programmed path of a predetermined shape and the machining gap between the electrodes is adjusted as a function of the machining conditions, the improvement comprising varying the speed of relative displacement of the electrodes as a function of the shape of said path such as to maintain constant the distance between the longitudinal axis of the wire electrode and one of the surfaces of the workpiece electrode.

2. The improvement of claim 1 wherein said relative speed is varied in the same direction as the variation of radius of curvature of said path.

3. The improvement of claim 1 wherein said relative displacement is inhibited for a time interval when the relative position of the electrodes is located at the vertex of an angular change of direction of said path.

4. The improvement of claim 3 wherein said time interval is varied as a function of the magnitude of said angular change of direction of said path.

5. The improvement of claim 1 wherein the energy of said electrical discharges is varied as a function of the curvature of said path.

6. The improvement of claim 1 wherein the frequency of said electrical discharges is varied as a function of the curvature of said path.

7. The improvement of claim 1 wherein the energy and the frequency of said electrical discharges are varied as a function of the curvature of said path.

8. In an apparatus for machining by means of intermittent electrical discharges applied between a wire electrode and a workpiece electrode wherein said electrodes are relatively displaced according to a programmed path of predetermined shape and the machining gap between said electrodes is adjusted as a function of the machining conditions, said apparatus comprising means for displacing said wire electrode and said workpiece electrode relative to one another, the improvement comprising means for developing at least one electrical signal varying as a function of the radius of curvature of said path, and means for varying said relative speed of displacement as a function of said electrical signal.

9. The improvement of claim 8 comprising means for controlling the machining speed as a function of the difference between a magnitude representative of the machining conditions and a reference magnitude, and means for modifying said difference as a function of said electric signal.

10. The improvement of claim 8 comprising means for developing a logic signal for inhibiting said relative displacement as soon as the relative position of said electrodes is situated at the vertex of an angular change of direction of said path, and means for maintaining said electrodes in such position during a time interval.

11. The improvement of claim 9 comprising means for maintaining said electrodes in the same relative position until the difference between said magnitude representing said machining conditions and said reference magnitude reaches a predetermined level.

12. The improvement of claim 10 comprising means for maintaining said electrodes in said position until the difference between said magnitude representing said machining conditions and said reference magnitude reaches a predetermined level.

13. The improvement of claim 8 comprising means for measuring the machining current flowing across said machine gap from the moment at which the relative displacement of said electrodes is inhibited, and means for maintaining said electrodes in the same relative position until the moment at which said current value reaches a predetermined value.

14. The improvement of claim 9 comprising means for integrating at least once the value of the difference between said magnitude representing said machining conditions and said reference magnitude from the moment at which the relative displacement of said electrode is inhibited, and means for maintaining said electrodes in the same relative position until the moment at which the value of said integration reaches a predetermined level.

15. The improvement of claim 10 comprising means for integrating at least once the value of the difference between said magnitude representing said machining conditions and said reference magnitude from the moment at which the relative displacement of said electrodes is inhibited, and means for maintaining said electrodes in the same relative position until the moment at which the value of said integration reaches a predetermined level.

16. The improvement of claim 8 comprising means for reducing the energy of said electrical discharges when said path presents a sharp curvature and for re-establishing said energy after said sharp curvature is passed.

17. The improvement of claim 8 comprising means for reducing the frequency of said electrical discharges when said path presents a sharp curvature and for re-establishing said frequency after said sharp curvature is passed.

18. The improvement of claim 8 comprising means for reducing the energy and frequency of said electrical discharges when said path presents a sharp curvature and for re-establishing said energy and frequency after said curvature is passed.

* * * * *

UNITED STATES PATENT AND TRADEMARK OFFICE
CERTIFICATE OF CORRECTION

PATENT NO. : 4,081,652

DATED : March 28, 1978

INVENTOR(S) : Johann Janicke et al

It is certified that error appears in the above-identified patent and that said Letters Patent are hereby corrected as shown below:

Column 6, line 64, "0.4" should be --0.04--.

Signed and Sealed this

Third Day of October 1978

[SEAL]

Attest:

RUTH C. MASON
*Attesting Officer*

DONALD W. BANNER
*Commissioner of Patents and Trademarks*